Inventors
DONALD CAMERON NICHOLAS
JAMES WILLIAM HEMPSTEAD
By Bacon & Thomas
Attorneys Inventors
DONALD CAMERON NICHOLAS
JAMES WILLIAM HEMPSTEAD July 31, 1962   D. C. NICHOLAS ETAL   3,046,599
STRETCHING APPARATUS Filed Dec. 30, 1960   5 Sheets-Sheet 5

Inventors
DONALD CAMERON NICHOLAS
JAMES WILLIAM HEMPSTEAD
By Bacon & Thomas
Attorneys

# 3,046,599
STRETCHING APPARATUS
Donald Cameron Nicholas, Ipswich, and James William Hempstead, Manningtree, England, assignors to B.X. Plastics Limited, London, England, a British company
Filed Dec. 30, 1960, Ser. No. 79,769
Claims priority, application Great Britain Dec. 30, 1959
9 Claims. (Cl. 18—1)

This invention relates to apparatus for stretching a moving web of material and is particularly, but not exclusively, applicable to the stretching of webs of plastic film.

It is known that the physical properties of certain plastic films can be improved by stretching, either when hot or cold, and to this end it is desirable that as far as possible the web should be under physical control while stretching takes place.

According to this invention there is provided apparatus for stretching a moving web of material including two endless articulated chains, means for guiding and driving each chain in a predetermined closed path, the guiding and driving means co-operating to ensure that in operation at the commencement of a working run of each chain the links thereof are folded in zigzag fashion and are expanded in the course of their movement along said working run, the working runs of the two chains being positioned to extend along opposite sides of a moving web being stretched, and a plurality of web holding means mounted on each chain at intervals therearound so that the spacing of the holding means varies according to the degree of folding of the links of the chains, the holding means being actuatable to hold the sides of a moving web at the commencement of said working runs and to release the moving web at the end of said runs whereby in operation the moving web is stretched as a result of the increase in the spacing of the holding means whilst they are holding the web consequent upon the expansion of the links of the chains in the course of their movements along said working runs.

In this specification the links of a chain which are folded in alternate directions, i.e. in zig-zag fashion, are said to expand when the angle included between adjacent links increases so that the effective length of the chain at that part increases. Conversely the links of a chain which are folded in zig-zag fashion are said to contract when the angle included between adjacent links decreases so that the effective length of the chain at that part decreases. By the effective length of any part of the chain is meant the distance of that part measured along the centre line of the chain as opposed to the length calculated as the sum of the lengths of the individual links constituting the part of the chain in question.

The expansion of the links of the chains in the course of their movement along the working runs thereof may take place over the whole working run or be confined to only part of the run. Thus it may be advantageous, for example, to confine the expansion of the links of the chains to a first part of the working runs thereof, so that over the remaining parts the web is merely held by the holding means with no stretching consequence upon the expansion of the links taking place. Such an arrangement could be adopted, for example, for the purpose of cooling the web if it had been stretched while hot or for an annealing step to relieve stresses created in the web by the stretching.

It will also be understood that the links of the chain need not be fully expanded at the end of the working run nor over an end part of the working run over which no further expansion is taking place.

The rate of expansion of the links of the chains and hence the rate of increase in the spacing of the holding means mounted thereon is determined by the guiding and driving means. Thus not only is the web held at intervals along each side while stretching takes place so that the web is under good physical control whilst it is stretched but also the rate of stretching is predetermined.

A web of material being stretched will normally be drawn through the apparatus according to the invention under longitudinal tension by conventional means such as driven nip rollers and any such feed means for the web will be synchronized with the driving means for the articulated chains of the stretching apparatus itself.

The working runs of the chains may be straight or curved or partly straight and partly curved and to give even stretching of the web, will normally be disposed with respect to the centre line of the web being stretched, as mirror images of one another. Thus if the working runs of the chains are parallel then the web will only be longitudinally stretched. If, however, the working runs of the chains diverge either in straight or curved lines over a whole or only part of their extent, then the web being held by the holding means will be stretched widthwise irrespective of whether or not in moving along the diverging parts of the working runs the links of the chains are expanded. If it is arranged so that in moving along the diverging parts of the working runs of the chains, the links are expanded, then the web will be stretched both widthwise and lengthwise simultaneously which, in the case of plastic films, has previously been proposed as a desirable object but for whose realisation there has hitherto been no apparatus available.

Some of the possible arrangements of the working runs of the chains will now be mentioned. In the simplest arrangement the working runs are parallel and expansion can take place over the entire extent or only over corresponding parts of the working runs. In a variation of this arrangement the straight working runs diverge and are arranged as mirror images of one another about the centre line of the web being stretched. Again expansion of the links of the chains and hence stretching of the web may be arranged to take place over all or only a part of the extent of the working run.

In another arrangement, the working runs each consist of two straight parts, corresponding parts of the working runs of the two chains diverging symmetrically about the centre line of the web and the remaining corresponding parts being parallel to one another and to the centre line of the web. The parallel straight parts may follow or precede the diverging parts and the expansion of the links may take part over either one or both parts.

Instead of straight working runs, curved ones may be provided e.g. arcuate runs. Such curved runs may be concave or convex as seen from the centre of the web therebetween and again will preferably be symmetrical about the longitudinal centre line of the web so that the one will be a mirror image of the other about this line. Again expansion of the links may take place over all or part of such curved runs. Moreover the working runs may comprise combinations of curved and straight parts.

It will be apparent from the foregoing that many arrangements of the working runs of the chains may be adopted according to this invention to suit the direction and rate of stretching to which it is desired to subject the moving web.

Each chain for mounting the web holding means is an articulated chain, that is to say, adjacent links thereof are pivotally connected to one another. The links are preferably of the kind having spaced members to enable driving teeth to extend therebetween. However, such links are not essential to the invention and solid links could be employed in which case extensions on the pivotal axes of the connections between links could be provided for engagement by suitable driving means such as driving sprockets.

Any suitable holding means for holding the edge of a moving web can be employed. Holding means for this purpose are known, particularly in the art of plastic film manufacture.

Dependent upon the form of the holding means, it may be possible to mount each such holding means directly upon the links of the chain. Alternatively a mounting for each holding means may be secured to the links of the chains, each holding means then being secured to the mounting therefor. The mountings or the holding means themselves may be guided in a predetermined path in which case by virtue of their mechanical connection with the chain, the guiding means therefor will necessarily constitute guiding means for the associated chain since its movement will be constrained thereby.

The holding means or mountings therefor may advantageously be pivotally mounted on the chains at the pivotal connections between the links thereof. For example the holding means may each be mounted on a mounting comprising two arms pivotally connected together at one pair of their ends and at their other ends pivotally mounted on the chain respectively at alternate connections between the links thereof for pivotal movement about the respective axes of said connections. Thus the two arms are joined at their said other ends by two links of the chain which remain free to fold upon one another in the course of their movement around the closed path described by the chain in the manner determined by the guiding and driving means. Alternatively each holding means may be mounted upon a mounting block and each block pivotally mounted on the chain at the pivotal connection between adjacent links thereof for pivotal movement about the pivotal axis of the connection. The mounting block can then be guided by suitable guiding means which thus also constitute guiding means for the chain.

Since the chain links are expanded from a folded arrangement over the whole or part of the working runs of the chains, it follows that over some other part of the closed path of the chain the links must be contracted, i.e. re-folded by the action of the guiding and driving means.

The guiding and driving means are interdependant and the form of one will bear upon that of the other. It will be realised that if an already folded chain is pushed into a converging guide channel, groove or the like, so that the ends of the links at the connections therebetween bear against the converging guide walls, then the links will be forced to expand gradually in their passage along said guide channel until, if the channel narrows sufficiently, they will be fully expanded, i.e. the included angle between adjacent links will be 180° and the chain at that part in its path will be straight. For this way of expanding the links of the chain it is of course essential that the links should be maintained in compression since they are not positively constrained to move in a predetermined path and under tension would immediately pull out straight.

An alternative way of obtaining the required expansion of the links of the chain over the working run thereof is to guide each link positively so that its motion is completely determined by the guide means. This can be achieved by guiding each link at two spaced points thereon by guide members such as pins or the like secured thereto and engaging in guiding grooves, channels or the like which if the links are to be fully straightened out will converge into a single groove, channel or the like. Such guide members or the like can advantageously be provided at the pivotal connections between the links so that one guide member located on the pivotal axis will serve positively to guide the ends of the two links connected at that point. A variation of the latter arrangement is to provide a guide member at alternate connections only between the links, the other connections either directly or indirectly mounting the holding means, which themselves are guided in such a manner as to determine the motion of the ends of the links at the connections on which the holding means are mounted. It will be appreciated that if the motion of the links of the chains is positively determined, then so far as obtaining the required contraction or expansion thereof is concerned it is immaterial whether they are driven in tension or compression although frictional considerations may make one or other way preferable.

If the necessary contraction of the links is to take place gradually then it will generally be necessary for the links to be guided positively so that their motion is completely determined by the guide means. Other methods of folding the links may be used however such as a capstan device for folding the links on themselves in alternate directions at the entrance to a suitable guide channel or immediately before a drive sprocket onto which alternate connections between the links are placed to be carried around thereby to the commencement of the working run of the chain.

Generally the chains will be driven at several points in their closed paths and the various driving means will drive the chain at the appropriate speeds at those points, the speed of the chain varying in its closed path owing to the expansion and contraction of the links thereof. Drive sprockets or toothed drive belts or chains may be employed as the driving means or a combination of both belts or chains and sprockets. Alternatively a screw feed could be used to drive the folded links, the helical flight of the screw engaging the chain at alternative pivotal connections between the links thereof, suitable bearing surfaces being provided on those connections. By using a screw of appropriately varying pitch the chain could be driven at alternate connections between the links whilst the links were expanding or contracting.

It will be understood that the two endless chains may each be disposed in a plane generally parallel to the plane of the web being stretched or alternatively generally at right angles thereto.

In order to reduce friction to a minimum, ball or roller bearings may be employed to provide a rolling contact between moving parts.

A preferred embodiment of the invention will now be described by way of example only with reference to the accompanying drawings in which.

Figure 1:
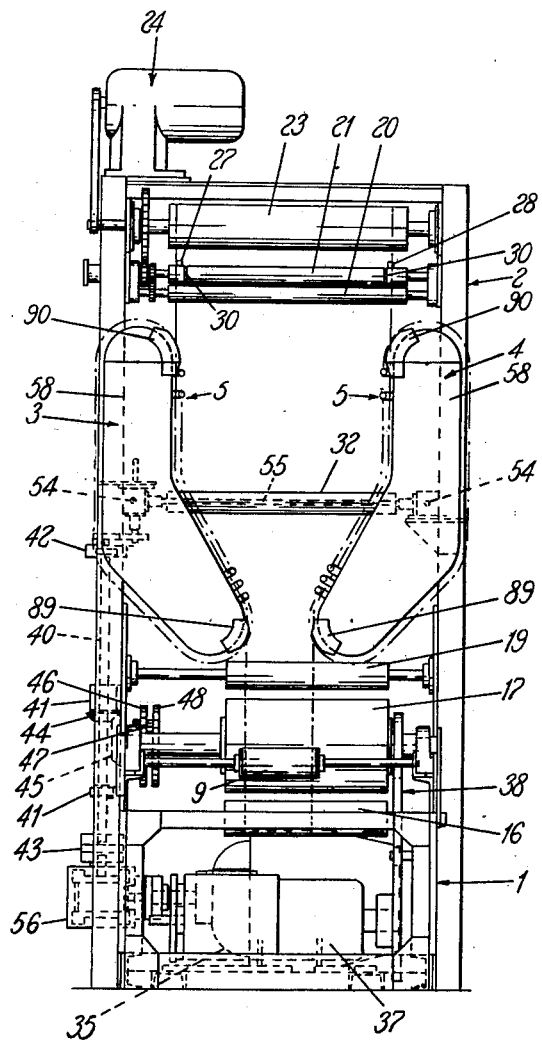
FIG. 1 is a front elevation of the preferred stretching apparatus.
Figure 2:
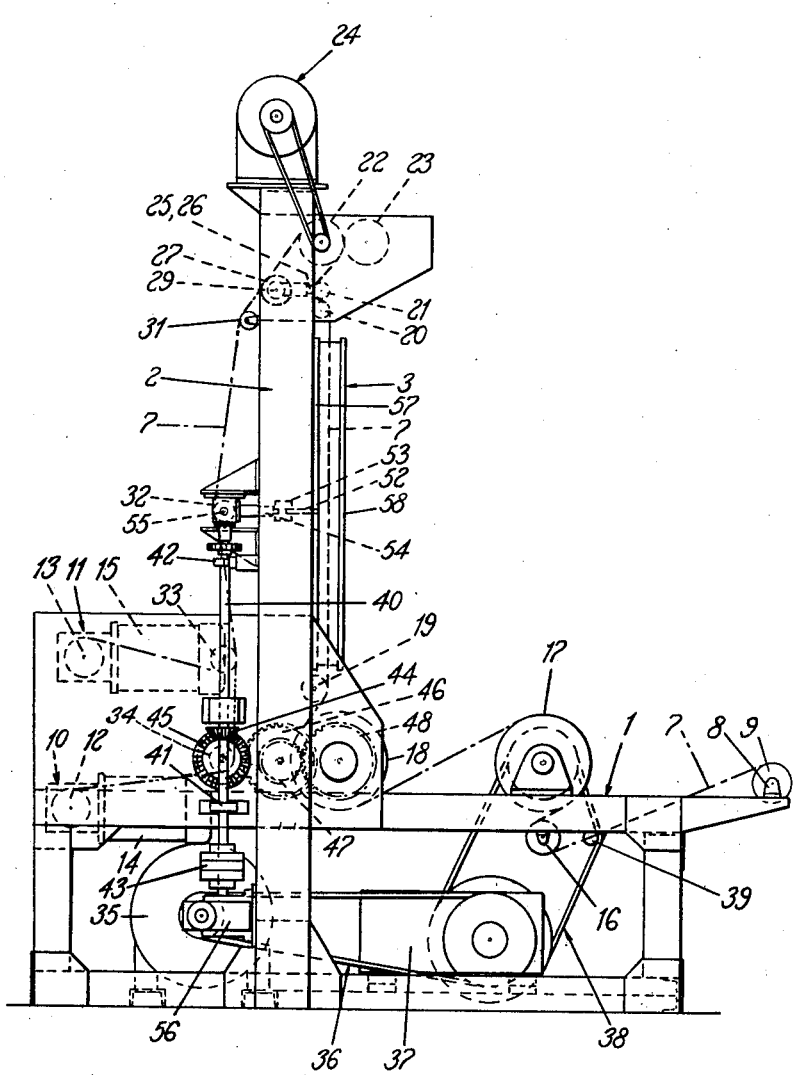
FIG. 2 is a side elevation of FIG. 1.

Referring to FIGS. 1 and 2, the stretching apparatus comprises a main frame 1 and a vertical frame 2 extending upwardly therefrom and serving to mount at the front thereof two chain units 3, 4 in a substantially vertical plane. The chain 6 (FIG. 3) of each chain unit mounts a plurality of holding means 5 which are carried around in a closed path by the chain 6 and over the working run of the chain 6 hold the edge of the web 7 being stretched at spaced intervals. Opposite sides of the web 7 are held by holding means 5 of the respective units 3, 4 and the working runs of the chains 6 diverge over part of their length and at the same time the spacing of individual holding means 5 increases as fully described hereafter so that in the result the web 7 is stretched both widthwise and lengthwise, as is evident from FIG. 1, in its passage between the units 3, 4.

Mounted at the front of the frame 1 is means 8 for mounting and letting off under tension a supply roll 9 of material to be stretched and at the rear of the frame, one above the other, two units 10, 11 for take-up rolls 12, 13.

The units are used alternately and are individually powered by variable speed motors 14, 15.

On the frame 1 between the means 8 and the bottom end of the units 3, 4 are mounted an idler roll 16 and two heated rolls 17, 18 spaced apart by a distance which is adjustable by movement of roll 17, around which the web 7 passes in succession.

Another idler roll 19 is mounted on the frame 2 beneath the units 3, 4 and the web 7 passes therearound before passing between the units 3, 4.

On the frame 2 and above the units 3, 4 are mounted two driven rolls 20, 21 one above the other and above them a pair of mangle rolls 22, 23 of which roll 22 is driven by a variable speed motor 24 mounted on top of frame 2.

Coacting with roll 21 are a pair of trimming knives 25, 26 respectively carried by collars 27, 28 transversely adjustable on a shaft 29 mounted in the frame 2. Knives 25, 26 extend into grooves 30 provided in the surface of roll 21. A plurality of grooves 30 may be provided in roll 21 to provide for adjustment of the spacing of knives 25, 26.

Mounted at the rear of frame 2 at vertically spaced intervals are idler rolls 31, 32, 33 and 34.

The web 7 on leaving the units 3, 4 passes around rolls 20, 21 and in passing around roll 21 the edges are trimmed by knives 25, 26. Thereafter the web 7 is drawn through mangle rolls 22 and 23 and passes successively either around idler rolls 31, 32 and 33 to take-up roll 13 of unit 11 or around rolls 31, 32, 33 and 34 to take-up roll 12 of unit 10, the units 10, 11 being used alternatively.

A variable speed motor 35 mounted in the main frame 1 is provided to drive the heated rolls 17, 18 as well as the chain units 3, 4.

The drive to heated roll 17 is by a belt and pulley drive 36 to a variable gear box 37 and thence via another belt and pulley drive 38 including a jockey pulley 39 to roll 17.

The drive to heated roll 18 is taken off a vertical drive shaft 40 mounted in bearings 41, 42 at the rear of frame 2. Shaft 40 is driven off the drive shaft of motor 35 through reduction gearing 56 via a flexible coupling 43. The drive to roll 18 is from a bevel gear 44 on shaft 40 via a gear train 45, 46, 47 and 48, bevel gear 45 being mounted concentrically with idler roll 34.

Each chain unit 3, 4 is driven by an endless toothed driving chain 49 (FIG. 3) carried by two sprockets 50, 51, of which sprocket 50 is driven. Each sprocket 50 is mounted on a drive shaft 52 connected by a flexible coupling 53 (FIG. 2) to another shaft 54 journalled in frame 2 and driven through bevel gearing (not shown) from a drive shaft 55 horizontally mounted at the rear of frame 2 and itself driven via bevel gearing (not shown) from drive shaft 40.

Figure 3:
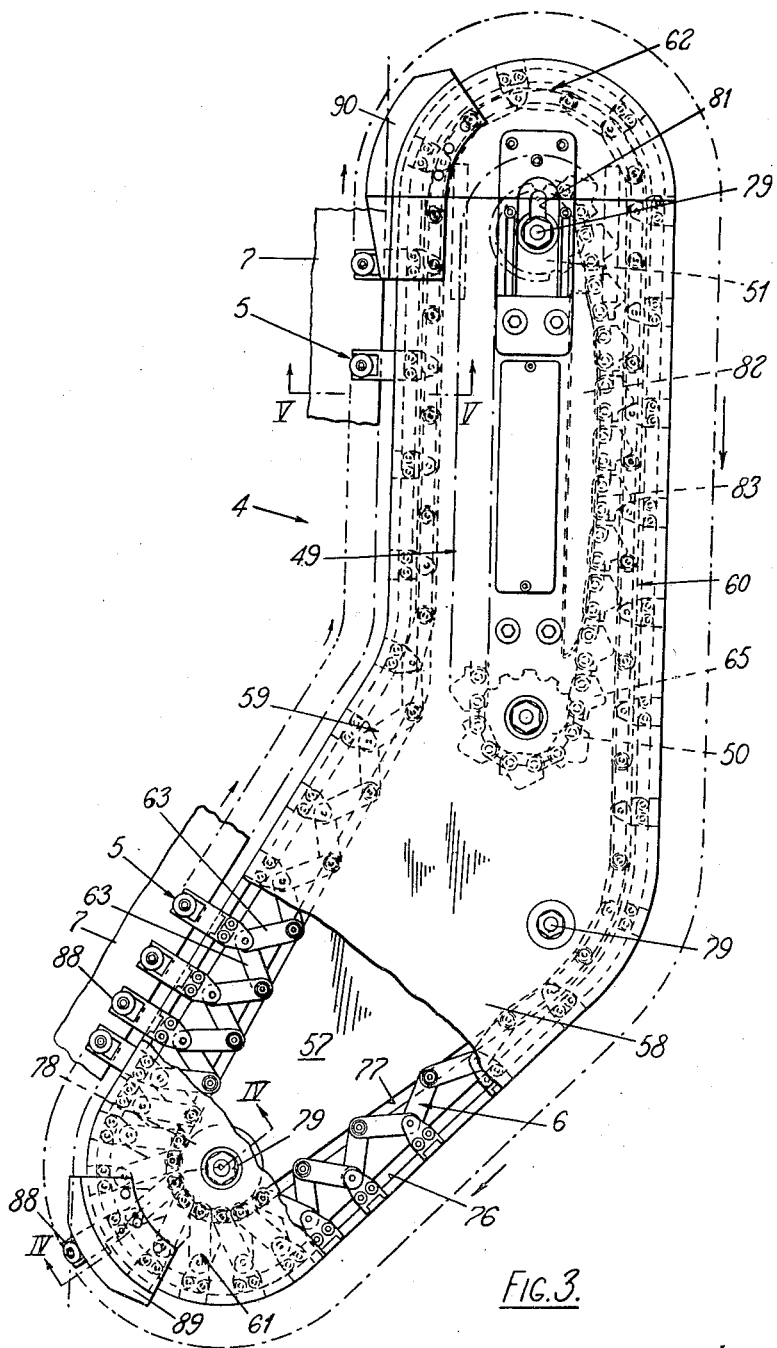
FIG. 3 is a plan view to an enlarged scale of one chain unit.

Idler roll 32 is journalled on drive shaft 55. Each chain unit 3, 4 includes an endless articulated chain 6 (FIG. 3). The chains 6 are each mounted between parallel plates 57, 58 held apart by spacers 79 and the units are mounted by means of these plates respectively on opposite sides of the vertical frame 2 (FIGS. 1 and 2).

Each chain 6 is guided in a closed path (see FIG. 3) having two generally parallel runs 59, 60 and two arcuate end runs 61, 62. The greater part of said parallel run 59 constitutes the working run of the chain at the commencement of which the links of the chain are fully folded upon one another in zig-zag fashion and at the end of which the links are fully expanded.

The parallel runs 59, 60 of the path followed by each chain are not straight but L-shaped with the included angle between the legs of the L being about 140°. Of the L-shaped run 59 constituting the working run of each chain, the first leg thereof is inclined away from the centre line of the web 7 being stretched whereas the second leg extends parallel to the centre line of the web.

The first legs of the two working runs 59 of the two endless chains 6 of the appaartus thus diverge symmetrically as mirror images of one another about the central line of the web 7, while the two second legs are parallel.

Figure 4:
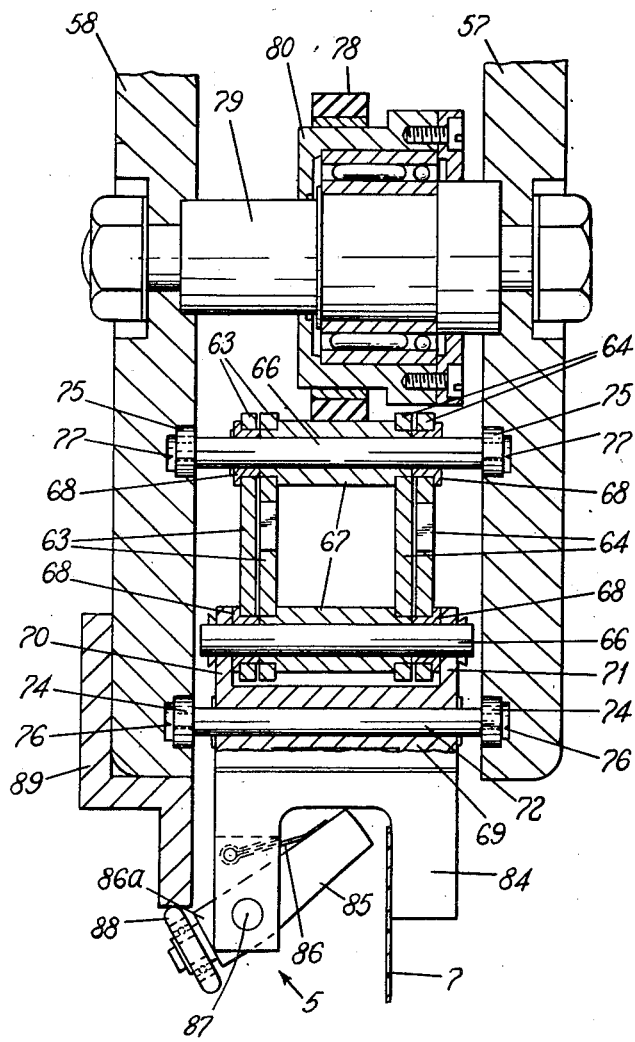
FIG. 4 is a fragmentary section to an enlarged scale on the line IV—IV of FIG. 3.

The chains 6 are to be regarded as being disposed in planes respectively generally parallel to the plane of the web 7 being stretched. Each endless articulated chain 6 described is of conventional construction inasmuch as each link has spaced elongate flat side members 63, 64 defining a slot between which the teeth 65 of the tooth driving chain 49 can extend (FIGS. 3 and 4).

Except in that the chains 6 of the units 3, 4 are arranged such that one is a mirror image of the other, the units 3, 4 are essentially identically constructed and therefore only unit 4 will be described in detail with reference to FIGS. 3 to 6.

The pivotal connection between adjacent links of the chain 6 comprises a pivot pin 66 upon which a spacer sleeve 67 is rotatably mounted. The sleeve serves to space the members 63, 64 apart and the inner pair of members 63, 64 at each pivotal connection is pivotally mounted respectively on reduced end portions of said sleeve. The outer pair of members 63, 64 at each pivotal connection pivotally engage bearing bushes 68 pivotally mounted on the pin 66 and abutting the ends of the sleeve 67.

Each holding means 5 is carried by a mounting block 69. Each mounting block 69 is pivotally mounted by two spaced lugs 70, 71 (FIGS. 4 to 6) at a pivotal connection between adjacent links of the chain for pivotal movement about the pivotal axis of that connection, the lugs 70, 71 respectively pivotally engaging opposite ends of the pivot pin 66 of the connection. One such block 69 is mounted at alternate connections between the links and each block has two pins 72, 73 extending therethrough and disposed parallel to one another and to the pivot pin 66 of the pivotal connection. The ends of the pins 72, 73 mount ball races 74.

The pivot pins 66 of the remaining alternate connections between links i.e. those not mounting the blocks 69, also mount at both ends thereof ball races 75.

In the inner surface of each of the parallel plates 57, 58 there are provided two separate endless grooves. The grooves are arranged opposite one another to provide two pairs of grooves 76, 77. Ball races 74 run in grooves 76 and races 75 in grooves 77. Thus the grooves 76, 77 and races 74, 75 constitute guiding means for the chain 6.

By virtue of the two races 74 on each of the two faces of the mounting blocks 69 the position of each block 69 and hence the pivotal connection of the chain to which it is pivotally connected is completely determined at all times, as is the position of the other pivotal connections of the chain which directly mount the guiding ball races. Thus the motion of the chain is completely determined by the guiding means therefor.

At the upstream end run 61 of the path of the chain the two pairs of guide grooves are spaced at their widest and consequently the links are folded. A rubber tyre 78 is mounted on a sleeve 80 freely journalled between the plates 57, 58 on a spacer 79 and is engaged around the end run 61 by those alternate pivotal connections between the links which are guided by the inner pair of grooves 77. Over the first leg of the working run 59 of the chain 6, the pair of guide grooves 76, 77 converge until, at the end of said leg, the links are fully expanded. Thereafter over the second leg of the working run 59 of the chain 6, the two pairs of grooves 76, 77 run parallel and continue so over the downstream end run 62 and over the second leg of the second parallel run 60 or return run until over the first leg of the return run they diverge to contract the links preparatory to their engaging said rubber tyre 78.

The web holding means 5 which, as seen, are indirectly mounted on the chain at alternate piovtal connections between the link thereof, as described hereafter, individually actuatable between closed and open positions respectively at the beginning and end of said working run of the chain to hold the side of the web 7 over said working run. As the links of the chain expand over the working run of the chain so the spacing of the holding means 5 on said mounting blocks 69 increases. The increase in the spacing of the holding means will be the same as the increase in the spacing of alternate pivotal connections between the links of the chain. Thus in operation of the apparatus with the holding means 5 gripping the sides of the web 7, the increase in their spacing along said working run will result in the web being stretched between them whilst being held thereby and thus being under physical control.

As described previously the chain 6 is driven by a toothed chain 49 disposed between plates 57, 58 and carried by sprockets 50, 51, sprocket 50 being driven. Sprocket 51 is adjustable in slots 81 in the plates 57, 58 for properly tensioning the chain 49. The chain 49 is disposed between the second legs of the parallel runs 59, 60 of the chain 6 and engages the chain 6 over a portion of the second leg of run 60. Since over this leg of its path the chain 6 is both straight and fully expanded it can be driven at a number of pivotal connections between the links thereof by the teeth of the chain 49.

The chain 49 is held in correct position relative to the chain 6 by an adjustable chain guide 82 having a guide rail 83 in contact with which run the pivotal connections between the links of chain 49.

Figure 5:
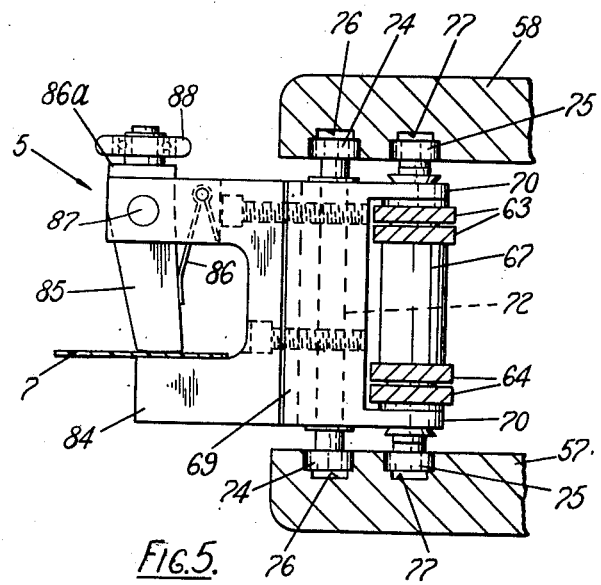
FIG. 5 is a fragmentary section to an enlarged scale on the line V—V of FIG. 3.
Figure 6:
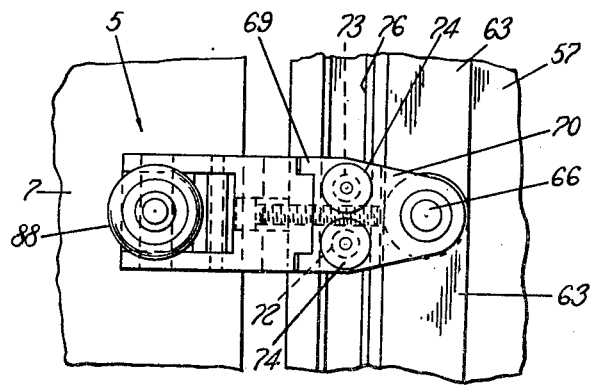
FIG. 6 is a plan view of FIG. 5.

Referring now particularly to FIGS. 4 to 6 each holding means 5, which is mounted on its block 69 as a lateral extension thereof, comprises a fixed jaw 84 and a movable jaw 85 normally biased by a spring 86 into contact with jaw 84. Movable jaw 85 is constituted by a pivotally mounted arm and an extension 86a thereof beyond the pivotal axis 87 mounts a roller 88 which serves as a cam follower.

Two short cam plates 89, 90 are mounted on plate 58 one each at the end runs 61, 62 of the chain respectively adjacent the beginning and end of the working run 59 of the chain. These plates 89, 90 serve momentarily to open the jaws 84, 85 of the holding means as they are carried past by the chain 6 so as to receive the web therebetween at the beginning of the working run and to release the web at the end of the working run.

The arrangement of the working run 59 of the chain 6 of this apparatus will ensure that a web 7 being stretched thereby will be stretched both widthwise owing to the divergence of the first legs of the working runs 59 of the chains and simultaneously lengthwise owing to the expansion of the links of the chain over said first legs of the working runs increasing the spacing of the holding means 5 mounted on said blocks 69. Over the second parallel legs of the working runs 59 of the chains no further stretching will take place and this will afford an opportunity for the web whilst held by the holding means 5 to cool if stretched hot or to be annealed if stretched cold.

We claim:

1. Apparatus for stretching a moving web of material including two endless articulated chains, means for guiding each chain in a closed path having a working run and a return run, the links of the chains at the commencement of each working run being guided by said guiding means so as to be folded in zig-zag fashion and to unfold in the course of their movement along said working run, the working runs of the two chains being positioned to extend along opposite sides of a moving web, at least a part of the working runs of the chains over which said links are expanded being divergent, drive means for each chain being disposed to make a plurality of driving engagements therewith along a part of said return run, said guiding means extending continuously along at least said working run and up to said drive means whereby said chains are drawn along said working runs under tension, and a plurality of web holding means mounted on each chain at intervals therealong so that the spacing of the holding means varies according to the degree of folding of the links of the chains, and means for actuating said holding means to grip and hold the sides of a moving web at the commencement of said working runs and to release said holding means from the moving web at the end of said runs whereby in operation the moving web is stretched as a result of the increase in the spacing of the holding means whilst they are holding the web consequent upon the unfolding of the links of the chains in the course of their movement along said working runs.

2. Apparatus as claimed in claim 1 wherein said guiding means completely unfolds said chains at least over said parts of said return runs whereat said driving means engage said chains.

3. Apparatus as claimed in claim 1 wherein said holding means is normally closed and is adapted to be cam operated to the open position and including short cams at the beginning and end of each working run momentarily to open said holding means to respectively engage and release said web.

4. Apparatus for stretching a moving web of material including two endless articulated chains, means for guiding and driving each chain in a predetermined closed path having a working run at the commencement of which the guiding means are arranged to confine the links of the chain so as to be folded in zig-zag fashion and fully unfold said links by the time they reach the end of said working run, the working runs of the two chains being positioned to extend along opposite sides of a moving web being stretched, the guiding and driving means being so arranged that said chains are drawn under tension along said working runs, and a plurality of normally closed web holding means mounted on each chain at intervals therealong so that the spacing of the holding means varies according to the degree of folding of the links of the chains, means for momentarily actuating the holding means to the open position at the beginning and end of the said working runs respectively to engage and release the moving web whereby in operation the moving web is stretched as a result of the increase in the spacing of the holding means whilst they are holding the web consequent upon unfolding of the links of the chains in the course of their movement along said working runs.

5. Apparatus as claimed in claim 4 wherein the guiding means extend completely around said paths to control the position of said links at all times.

6. Apparatus for stretching a moving web of material including two endless articulated chains, means for guiding and driving each chain in a predetermined closed path having a working run and a return run, said guiding means controlling the links of the chains so that at the commencement of each working run they are folded in zig-zag fashion and unfolded in the course of their movement along said working run, the working runs of the two chains being positioned to extend along opposite sides of a moving web, at least a part of the working runs of the chains over which said links are expanded being divergent, and a plurality of web holding means pivotally connected with each chain at alternate pivotal connections between the links thereof so that the spacing of the holding means varies according to the degree of folding of the links, said guiding means for each chain including means for positively determining the attitude of the holding means as they are carried around by said chain and further means guiding the chain at the remaining alternate pivotal connections therebetween, the holding means being actuatable to hold the sides of a moving web at the commencement of said working runs and to release the moving web at the end of said runs whereby in operation the moving web is stretched as a result of the increase in the spacing of the holding means whilst they are holding the web consequent upon the expansion of the links of the chains in the course of their movement along said working runs.

7. Apparatus as claimed in claim 6 wherein said guiding means for each chain includes two endless guide tracks, namely an inner and an outer guide track and guide members on said holding means and said chain respectively engaging said inner and outer tracks.

8. Apparatus as claimed in claim 7 wherein two spaced guide rollers are provided at one side of said holding means to run in said outer guide track.

9. Apparatus as claimed in claim 7 wherein two such endless guide tracks are provided on each side of each said chain and its associated holding means, guide members likewise being provided on each side of said chain and holding means to engage said pairs of tracks.

References Cited in the file of this patent

UNITED STATES PATENTS

| 2,297,645 | Bailey | Sept. 29, 1942 |
| 2,412,187 | Wiley et al. | Dec. 3, 1946 |
| 2,923,966 | Tooke et al. | Feb. 9, 1960 |